No. 700,191. Patented May 20, 1902.
L. GROTE.
MACHINE FOR MAKING GLASS BOTTLES.
(Application filed July 13, 1900.)
(No Model.) 5 Sheets—Sheet 1.
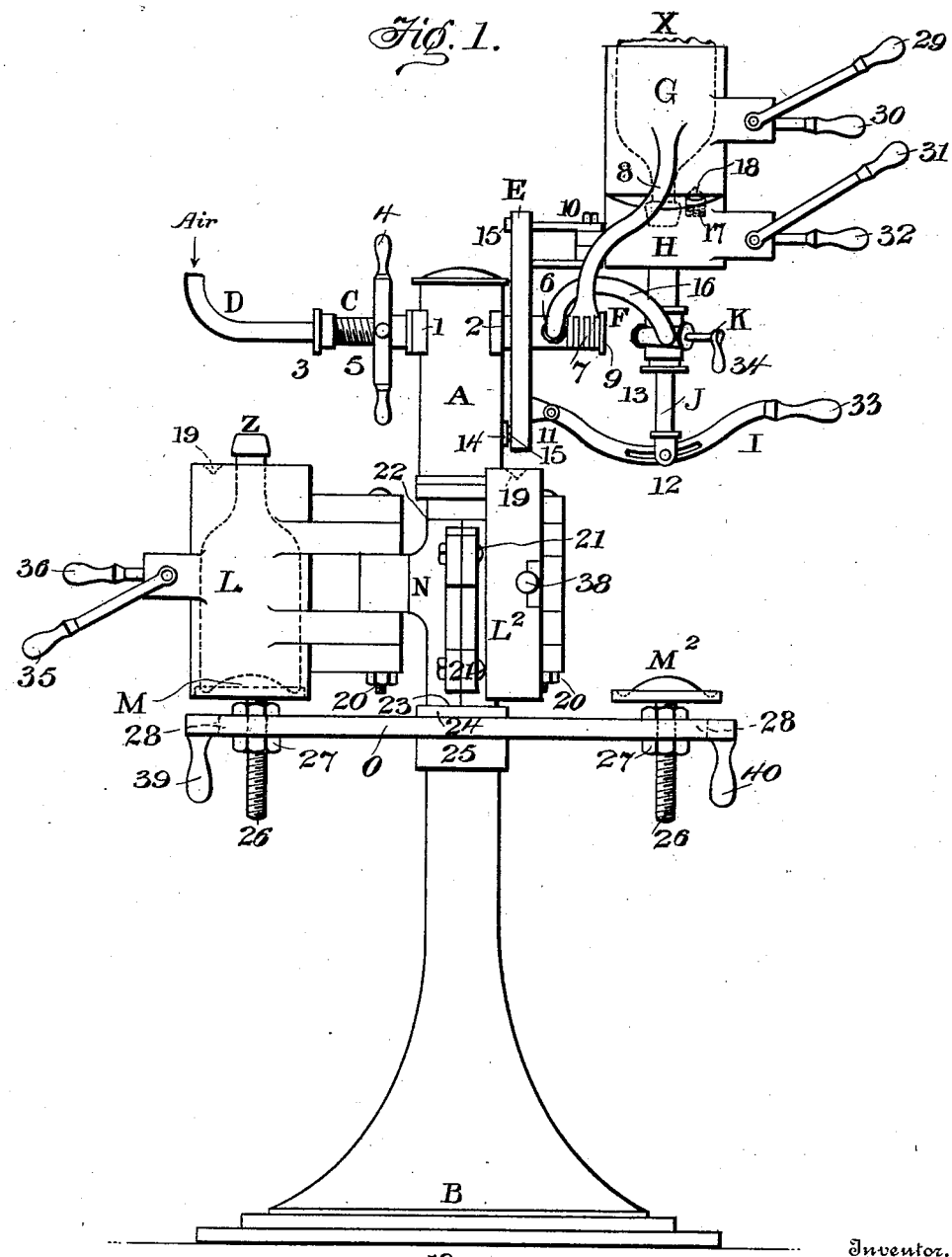
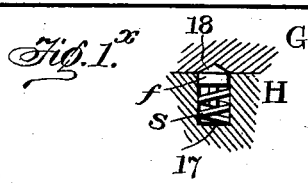

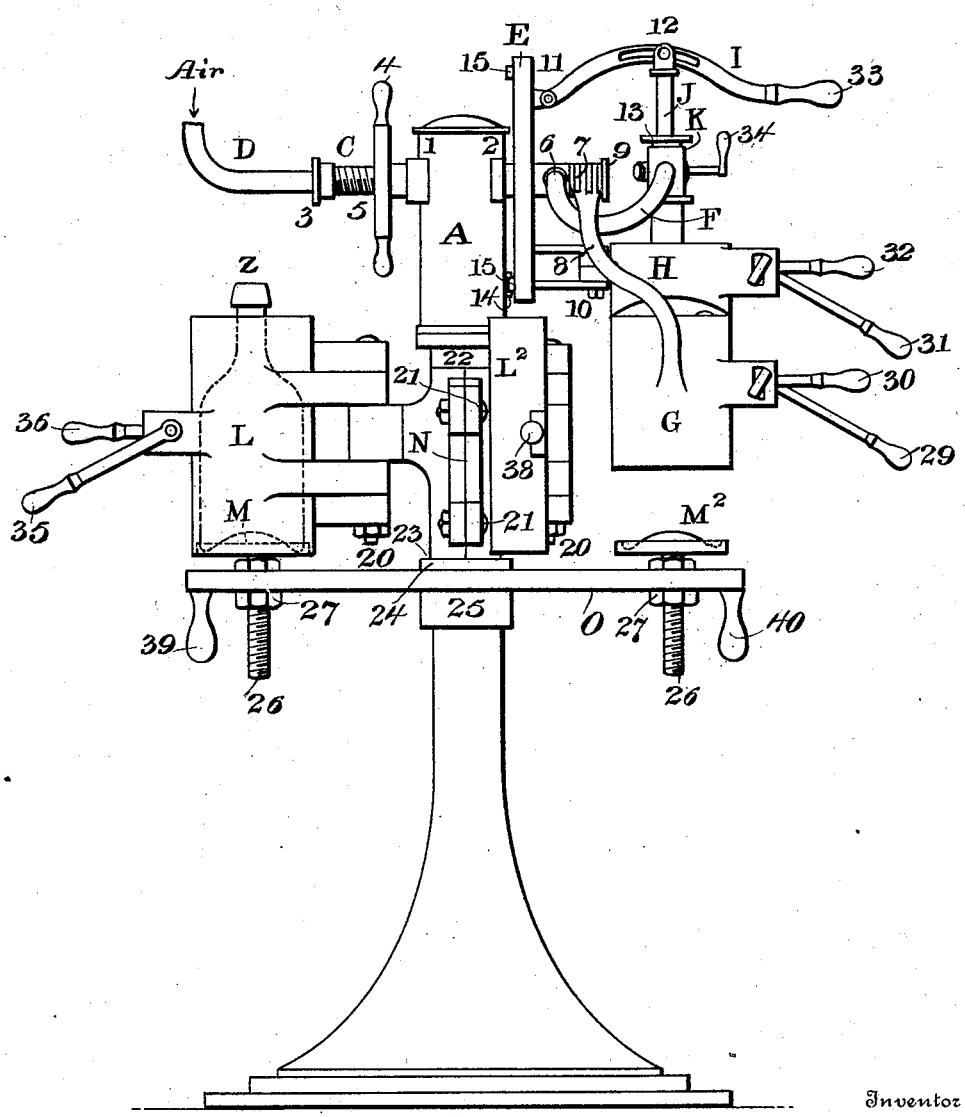

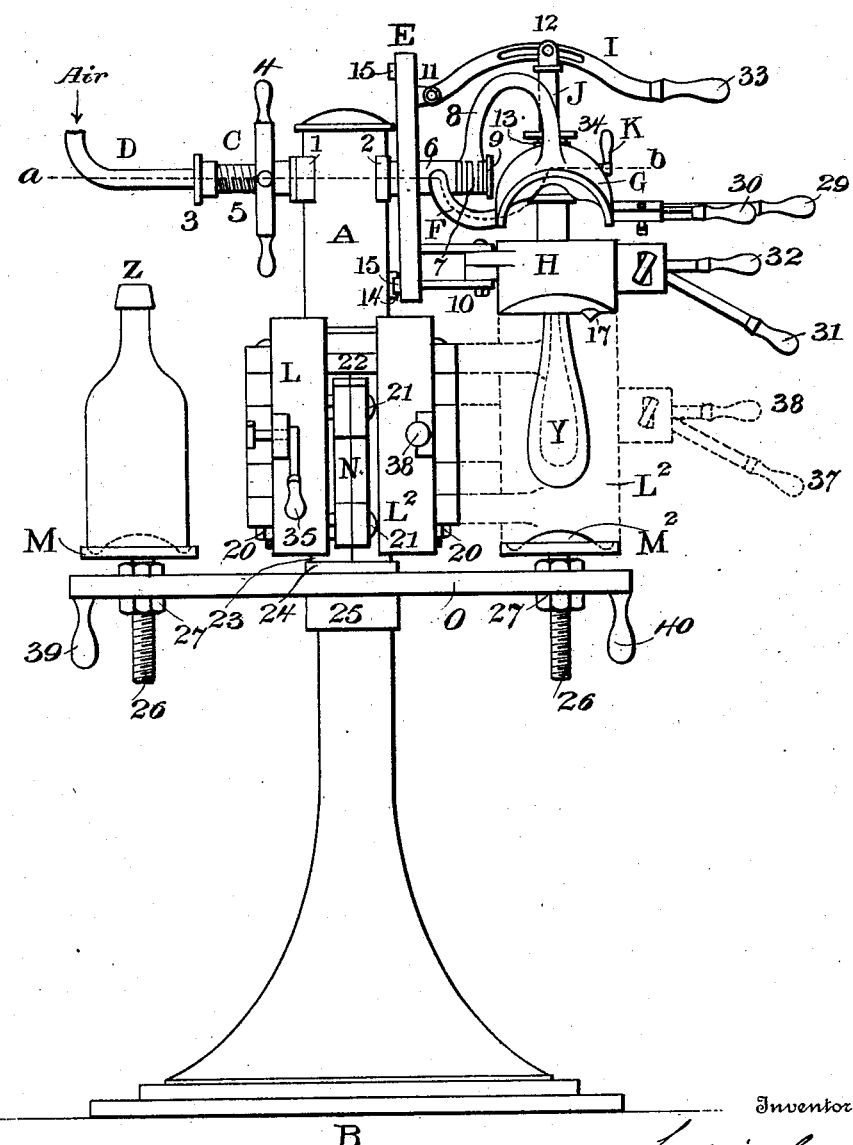

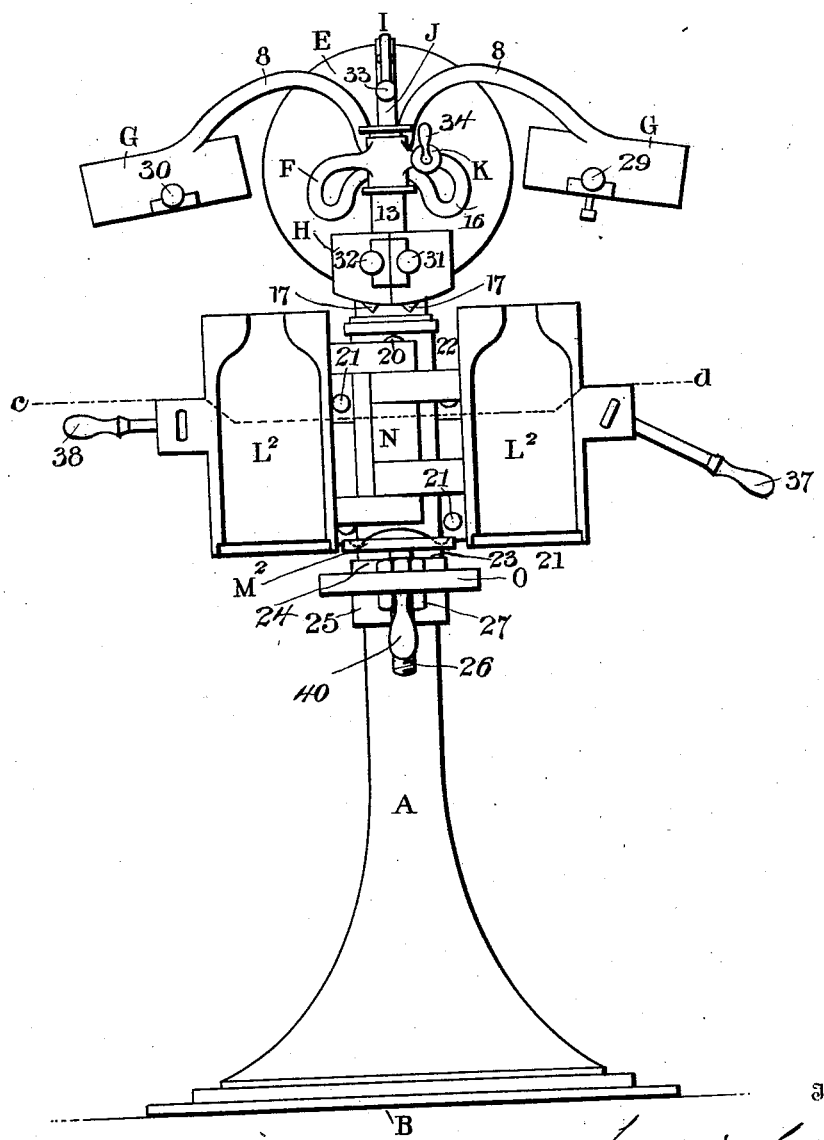

No. 700,191. Patented May 20, 1902.
L. GROTE.
MACHINE FOR MAKING GLASS BOTTLES.
(Application filed July 13, 1900.)
(No Model.) 5 Sheets—Sheet 5.

Witnesses
Fenton S. Belt.

Inventor
Ludwig Grote
by Francis Forbes
his Attorney.

UNITED STATES PATENT OFFICE.

LUDWIG GROTE, OF LONDON, ENGLAND, ASSIGNOR TO GROTE BOTTLE MACHINE COMPANY, OF JERSEY CITY, NEW JERSEY, A CORPORATION OF NEW JERSEY.

MACHINE FOR MAKING GLASS BOTTLES.

SPECIFICATION forming part of Letters Patent No. 700,191, dated May 20, 1902.

Application filed July 13, 1900. Serial No. 23,516. (No model.)

*To all whom it may concern:*

Be it known that I, LUDWIG GROTE, a subject of the Emperor of Germany, residing at 84$^B$ East India Dock road, Poplar, London, England, have invented a new and useful Improvement in Machines for Making Glass Bottles, of which the following is a specification.

This invention relates to the manufacture of glass bottles by casting and blowing combined as practiced in part by means of machinery in the manner set forth in my previous specifications, forming part of United States Letters Patent No. 628,313, dated the 4th day of July, 1899, and Nos. 656,286 and 656,322, dated the 21st day of August, 1900.

The present invention consists in an improved glass-bottle machine that is constructed without many of the complications which have heretofore been considered necessary and that is adapted to be rapidly and economically operated. Simplicity is of great importance in such machines, owing to the high heat of the molten glass or "metal" for the product hereinafter termed the "glass" and the necessity for using metallic molds and appurtenances which quickly "absorb" heat and are greatly affected by expansion and contraction; also, because it is desirable to avoid as much as possible delay for cooling the machine in order that work may proceed as rapidly as practicable while the glass is in blowing condition, and so as to produce as many bottles as possible per hour.

The invention further consists in certain novel combinations of parts the nature and objects of which are hereinafter set forth.

Five sheets of drawings accompany this specification as part thereof.

Figure 5:
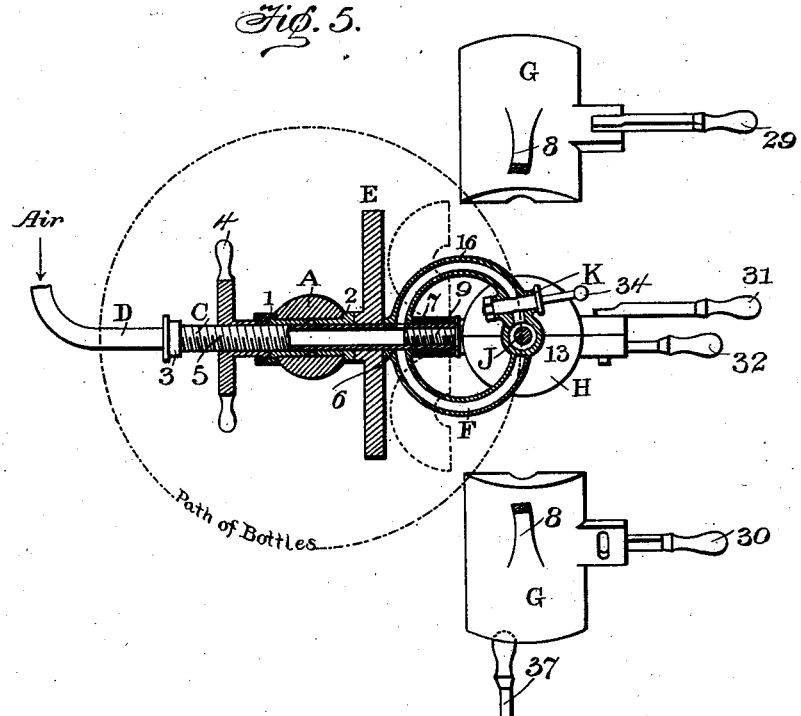
Figure 6:
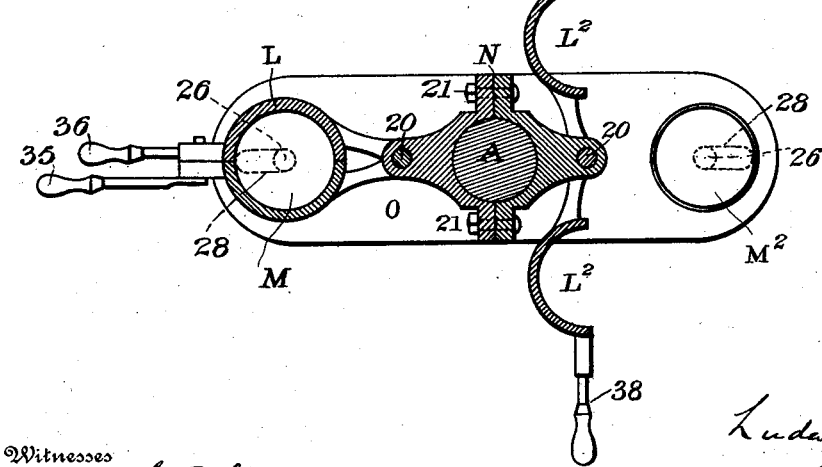

Figure 1 of the drawings is a side elevation of the improved machine, illustrating the operation of casting the parison. Fig. 1$^\times$ is a sectional detail hereinafter described. Fig. 2 is a side elevation showing the parison-mold reversed. Fig. 3 is a side elevation showing the parison-mold opened, exposing a depending parison and the finishing body-mold at the delivery-point opened, exposing a finished bottle for removal and in dotted lines a body-mold closed around said parison for the finishing operation. Fig. 4 is a front view with the parts as in Fig. 3, omitting the glass. Fig. 5 represents a substantially horizontal section on the line $a\,b$, Fig. 3, and illustrates by dotted lines the release of a bottle by the neck-mold. Fig. 6 represents a substantially horizontal section on the line $c\,d$, Fig. 4.

Like letters and numbers refer to like parts in the several figures.

The improved machine comprises a pillar A, supported in upright position by a base B, which may be and preferably is circular in plan view and integral with the pillar, which may be an iron casting and either solid or hollow.

At or near the upper end of the pillar A a horizontal bore perpendicular to the front of the machine and preferably provided with bushings 1 and 2 accommodates a tube C, to the rear end of which an air-pipe D is made fast by a coupling 3 and which is preferably adjustable lengthwise by means of a hand-wheel nut 4, swiveled to the bushing 1 and coacting with screw-threads 5 on the tube C.

In front of the pillar A a loose face-plate E is mounted on the tube C, together with the loose hub 6 of a combined plunger-support and air-conduit F and the interlaced loose knuckles 7 of the supporting-arms 8 of a bisected parison-mold G, the escape of these parts from the pivotal end of the tube C being prevented by suitable means—as, for example, an axial screw 9.

To the face-plate E are hinged at 10 and 11, respectively, the halves of a bisected head-mold or "neck-mold" H and a hand-lever I for actuating the mouth-forming and air-admitting plunger J, which is coupled thereto at 12 and is guided by the normally-vertical sleeve portion 13 of the plunger-support and air-conduit F.

Suitable stops 14 and 15 on the pillar A and the face-plate E, respectively, arrest the face-plate and the parts that turn therewith in the respective positions of rest in which they are shown in Fig. 1 and in Fig. 2, for example. The chamber of said sleeve portion 13 of the plunger-support and air-conduit F communicates with the interior of the tube C by way of one arm 16 of the same, and this arm is provided with the housing or shell of an air-cock K, by which the blowing operation is controlled.

The neck-mold H is provided with a pair of spring-detents 17, one in each of its halves, and the halves of the parison-mold G and of the finishing body-molds L and L² are provided with counterparts 18 and 19, Fig. 1, to coact therewith for stopping the molds in alinement without positively interlocking the parts with each other. Such detents 17 may be, for example, of the known construction represented in Fig. 1×, where s represents a spiral spring sunk within a drilled socket in the end face of the neck-mold H, f represents a follower seated on the spring s and having a conical point, the projection of which is limited, as by contracting the outer end of the socket, and 18 represents the detent counterpart in the end face of the parison-mold G in the form of a conical indentation, into which the detent 17 springs when the parts are alined, as in Fig. 1, and which is disengaged from the detent by such force as can readily be exerted by the hands of the operator. The plunger J is intended to be of the construction and mode of operation set forth in my previous specification forming part of said Letters Patent No. 656,286 and the cock K of the construction and mode of operation set forth in both of said previous specifications; but for the purposes of the present invention these parts and the several molds, apart from the features called for by the respective claims hereto appended, may be of any known or improved construction that is not inconsistent with the present combination and arrangement of molds and their appurtenances, broadly considered. The finishing-molds consist of said body-molds L and L², which are open at both ends, and bottom-molds M and M² in combination with the neck-mold H. (See Fig. 3.)

The halves of each body-mold are hinged together and at the same time to a carrier N by a vertical hinge-bolt 20. The carrier is preferably and conveniently made in halves united by bolts 21, so as to facilitate applying it to the pillar A, around which it turns between shoulders 22 and 23, that determine the horizontal plane in which the carrier and the body-molds hinged thereto revolve. The upper ends of the body-molds are thus readily made to close snugly beneath the reversed neck-mold, as in dotted lines in Fig. 3, with the aid simply of suitable stops or alining detents 17, as above described.

The bottom-molds M and M² are preferably and conveniently carried by one and the same support O, turning around the pillar A, between collars 24 and 25. The bottom-molds are rendered vertically adjustable, as by screw-stems 26 and nuts 27, to insure tight joints between them and the lower ends of the body-molds; but when once adjusted for a given combination of molds they will ordinarily require no further attention. The bottom-molds M and M² are also rendered adjustable toward and away from the axis of the pillar A in common with the neck-mold, as by means of slots 28 to receive the screw-stems 26, and it will be understood that in connection therewith the stops 14 and 15, attached to the pillar A and face-plate E, either or both, must be correspondingly adjustable. These adjustments are only required, however, when it is desired to accommodate in one and the same machine molds varying somewhat widely as to diameter for different sizes and styles of bottles. Ordinarily the machine may be made without such adjustments and its simplicity of construction thus further increased.

Handles 29 to 40, inclusive, provide for manipulating the movable parts, and the handles 29, 31, and 35 are pivoted and operate the locking devices of the several molds in a known manner set forth in said previous specifications.

In operation the neck-mold H being closed and then the parison-mold G the latter is by the same act clamped against the end face of the neck-mold that is provided with the detents 17 and the cavities of the two are alined with each other by said detents. Grasping the handles 30 and 32, the operator then inverts the parts that turn on the pivot-tube C, so that they present the appearance represented in Fig. 1. The parison-mold G and neck-mold H are then filled by an attendant with molten glass, as represented at X, Fig. 1, and the head of the bottle is cast within the neck-mold. Meanwhile the grasp of one hand has been transferred to the handle 33, and the lever I, and therewith the plunger J, is reciprocated. A single reciprocation forms the mouth of the bottle and leaves an initial cavity in the glass, into which air is at once gently admitted by manipulating the handle 34 of the air-cock K. With the cock K partly open and the plunger J retracted the face-plate E and the parts turning therewith are reversed on the pivot-tube C by means of the handles 30 and 32 or 32 and 33, bringing said parts into the positions represented in Fig. 2. The parison-mold G is then unlocked by means of its handle 29, and by means of the same and the handle 30 the halves are separated and swung up into the elevated position in which they are shown in Figs. 3, 4, and 5. This exposes the glass with the same hanging from the neck-mold H, as shown at Y in Fig. 3, only at first irregular in shape. It is brought approximately to the form represented in Fig. 3 by working its lower end into a hemispherical shape, and thus rendering the bottom glass homogeneous and free from crevices and imperfections, or if bottles with deeply-indented bottoms (deep kickups) are to be produced it is worked and paddled in the manner set forth in my previous specification forming part of Letters Patent No. 656,287, dated the 21st day of August, 1900. Meanwhile the gentle introduction of air is continued. Finally, one of the finishing body-molds L or L² is closed by means of its handles 35 36 or 37 38 around the depending glass, and the blowing of the bottle is completed by manipulating the handle 34 of the air-cock K. The neck-mold H is then opened on its hinge 10, as shown in dotted lines in Fig. 5, so as to release the head of the bottle. Meanwhile if a bottle has just been blown in the other body-mold L it has been standing in the mold at the delivery-point of the machine, as at Z in Figs. 1 and 2, and its mold is opened, as in Fig. 3, and the bottle is lifted by its head and carried off by the time the operator is through with the newly-blown bottle. The support O and the pairs of body-molds and bottom-molds are then turned around the pillar A by means of one of the handles 39 40 to carry the newly-blown bottle into the delivery position Z and an empty and open body-mold L² before the operator. He then, if he has not already done so, closes the empty neck-mold H and swings the halves of the parison-mold G into position beneath it, as in Fig. 2, and then turns these parts into position, Fig. 1, to receive a fresh charge of glass X, and thus the operation proceeds step by step without any unnecessary delay or interruption.

In practice the means for adjusting the machine for different sizes of bottles may preferably be omitted in machines for large establishments, as already indicated. Ball-bearings may be provided at 22, 23, 24, and 25 to facilitate turning the finishing body-molds and bottom-molds around the pillar A, and other like modifications and mechanical details will suggest themselves to those skilled in the art.

Having thus described said improvement, I claim as my invention and desire to patent under this specification—

1. The combination, in a machine for making glass bottles, of a vertical pillar; a bisected neck-mold, a bisected parison-mold and means for admitting air supported by said pillar and reversible together on a horizontal axis, the halves of said parison-mold being movable apart and upwardly into another plane after inversion; bisected finishing body-molds the parts of which in succession are movable horizontally on a vertical axis into the positions vacated by those of said parison-mold beneath the common neck-mold, finishing bottom-molds coacting in succession with a body-mold and said neck-mold, and supports for said body-molds and bottom-molds movable horizontally around said pillar and supported thereby.

2. The combination, in a machine for making glass bottles, of a vertical pillar; a bisected neck-mold, a bisected parison-mold, a mouth-forming and air-admitting plunger and a combined plunger-support and air-conduit, supported by said pillar and reversible together on a horizontal axis, the halves of said parison-mold being movable apart and upwardly into another plane after inversion, bisected finishing-molds the parts of which in succession are movable horizontally on a vertical axis into positions vacated by those of said parison-mold beneath the common neck-mold, finishing bottom-molds coacting in succession with a body-mold and said neck-mold and supports for said body-molds and bottom-molds movable horizontally around said pillar and supported thereby.

3. The combination, in a machine for making glass bottles, of a vertical pillar; a bisected neck-mold a bisected parison-mold and means for admitting air, supported by said pillar and reversible together on a horizontal axis, the halves of said parison-mold being movable apart and upwardly into another plane after inversion; a pair of finishing body-molds and bottom-molds pivotally supported by said pillar in juxtaposition to the inverted neck-mold and movable horizontally in succession into alinement therewith and into a diametrically opposite delivery position.

4. The combination, in a machine for making glass bottles, of a vertical pillar; a bisected neck-mold, a bisected parison-mold, a mouth-forming and air-admitting plunger and a combined plunger-support and air-conduit supported by said pillar and reversible together on a horizontal axis, the halves of said parison-mold being separable to expose the partly-formed bottle depending from the neck-mold; and subjacent finishing body-molds and bottom-molds supported by said pillar and movable on its vertical axis into successive alinement with the inverted neck-mold, for coöperation therewith in completing successive bottles.

5. The combination, in a machine for making glass bottles, of a head-casting neck-mold composed of parts separable laterally to release the finished bottle, and provided with spring-detents projecting from its end face, and interchangeable parison-molds and finishing body-molds composed of laterally-separable parts coacting with said detents to aline themselves in succession with said neck-mold.

6. The combination, in a machine for making glass bottles, of a head-casting neck-mold composed of parts separable laterally and reversible on a horizontal axis, a parison-mold composed of laterally-separable parts and reversible with said neck-mold, a finishing body-mold composed of laterally-separable parts interchangeable with those of said parison-mold, spring-detents retaining the other molds successively in alinement with said neck-mold, and handles by which the resistance of said detents is overcome.

7. The combination, in a machine for making glass bottles, of a horizontal air-tube, a face-plate turning on the axis of said air-tube, a pair of laterally-separable neck-mold parts and a hand-lever carried by said face-plate, a pair of parison-mold parts separable on the axis of said air-tube, a combined plunger-support and air-conduit supported by said air-tube, and a mouth-forming and air-admitting plunger actuated by said hand-lever.

8. The combination, in a machine for making glass bottles, of a head-casting neck-mold reversible to suspend the partly-formed bottle, a plurality of finishing body-molds pivotally supported in their working plane and movable in succession into and out of alinement with the reversed neck-mold, for completing successive bottles, and a vertical pillar supporting the whole and around which said body-molds revolve.

9. The combination, in a machine for making glass bottles, of a head-casting neck-mold composed of parts separable horizontally to release the finished bottle, a plurality of finishing body-molds, open at both ends, movable successively into alinement with said neck-mold and each composed of horizontally-separable parts, a plurality of bottom-molds coacting with the lower ends of said body-molds respectively, and movable horizontally therewith after the blowing is completed, and a supporting-pillar common to said neck-mold, body-molds and bottom-molds, and around which said body-molds and said bottom-molds revolve, substantially as hereinbefore specified.

LUDWIG GROTE.

Witnesses:
JAS. L. EWIN,
ANDREW FOULD, Jr.